United States Patent
Liu (10) Patent No.: US 12,081,668 B2
(45) Date of Patent: Sep. 3, 2024

(54) AUTHENTICATION METHOD, CONTENT DELIVERY NETWORK CDN, AND CONTENT SERVER

(71) Applicant: PETAL CLOUD TECHNOLOGY CO., LTD., Dongguan (CN)

(72) Inventor: Deqian Liu, Shenzhen (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 639 days.

(21) Appl. No.: 17/264,723

(22) PCT Filed: Jul. 31, 2019

(86) PCT No.: PCT/CN2019/098627
§ 371 (c)(1),
(2) Date: Jan. 29, 2021

(87) PCT Pub. No.: WO2020/024987
PCT Pub. Date: Feb. 6, 2020

(65) Prior Publication Data
US 2021/0314156 A1    Oct. 7, 2021

(30) Foreign Application Priority Data
Aug. 1, 2018    (CN) .......................... 201810866250.1

(51) Int. Cl.
*H04L 9/32*    (2006.01)
*H04L 9/08*    (2006.01)
(Continued)

(52) U.S. Cl.
CPC .......... *H04L 9/3213* (2013.01); *H04L 9/0861* (2013.01); *H04L 9/14* (2013.01);
(Continued)

(58) Field of Classification Search
None
See application file for complete search history.

(56) References Cited

U.S. PATENT DOCUMENTS

2012/0072608 A1   3/2012   Peters et al.
2013/0269020 A1*   10/2013   Griffin .................. H04L 63/083
                                                                    726/9
(Continued)

FOREIGN PATENT DOCUMENTS

CN    103069776 A    4/2013
CN    103379172 A    10/2013
(Continued)

OTHER PUBLICATIONS

Zhu, H., Yuan, Y., Chen, Y., Zha, Y., Xi, W., Jia, B. and Xin, Y., 2019. A secure and efficient data integrity verification scheme for cloud-IoT based on short signature. IEEE Access, 7, pp. 90036-90044. (Year: 2019).*

(Continued)

*Primary Examiner* — Luu T Pham
*Assistant Examiner* — Edward X Long
(74) *Attorney, Agent, or Firm* — HAUPTMAN HAM, LLP (57) ABSTRACT

An authentication method, a content delivery network CDN, and a content server are provided. The method includes: receiving, by a CDN, a content access request that is sent by a client and that carries a first authentication credential and a second authentication credential, where the first authentication credential is generated by a content server based on a first key allocated by the CDN, and the second authentication credential is generated by the content server based on a second key allocated by a cloud server; performing, by the CDN, authentication on the first authentication credential by using the first key; and performing, by the cloud server, authentication on the second authentication credential by (Continued)

using the second key. In this manner, the CDN and the cloud storage server separately allocate different keys to the content server.

14 Claims, 6 Drawing Sheets

(51) Int. Cl.
 *H04L 9/14* (2006.01)
 *H04L 9/40* (2022.01)
 *H04N 21/258* (2011.01)
(52) U.S. Cl.
 CPC .......... *H04L 9/3247* (2013.01); *H04L 63/108* (2013.01); *H04N 21/25816* (2013.01)

(56) References Cited

U.S. PATENT DOCUMENTS

| | | | |
|---|---|---|---|
| 2018/0077222 A1 | 3/2018 | Shnitko et al. | |
| 2018/0097831 A1* | 4/2018 | Uppal | H04L 9/3236 |
| 2019/0327223 A1* | 10/2019 | Kumar | H04L 63/0853 |

FOREIGN PATENT DOCUMENTS

| | | |
|---|---|---|
| CN | 103780654 A | 5/2014 |
| CN | 104580177 A | 4/2015 |
| CN | 104811438 A | 7/2015 |
| CN | 105357190 A | 2/2016 |
| CN | 105991603 A | 10/2016 |
| CN | 106936574 A | 7/2017 |
| CN | 107517194 A | 12/2017 |
| CN | 107707514 A | 2/2018 |
| CN | 109347637 A | 2/2019 |

OTHER PUBLICATIONS

Jiang, Q., Ni, J., Ma, J., Yang, L. and Shen, X., 2018. Integrated authentication and key agreement framework for vehicular cloud computing. IEEE Network, 32(3), pp. 28-35. (Year: 2018).*
Chinese Notice of Allowance issued in corresponding Chinese Application No. 201810866250.1, dated Oct. 29, 2020, pp. 1-4.
International Search Report issued in corresponding International Application No. PCT/CN2019/098627, dated Oct. 29, 2019, pp. 1-10.
Chinese Office Action issued in corresponding Chinese Application No. 201810866250.1, dated Dec. 25, 2019, pp. 1-11.

* cited by examiner

AUTHENTICATION METHOD, CONTENT DELIVERY NETWORK CDN, AND CONTENT SERVER

CROSS-REFERENCE TO RELATED APPLICATIONS

This application is a National Stage of International Patent Application No. PCT/CN2019/098627 filed on Jul. 31, 2019, which claims priority to Chinese Patent Application No. 201810866250.1, filed on Aug. 1, 2018. Both of the aforementioned applications are hereby incorporated by reference in their entireties.

TECHNICAL FIELD

This application relates to the field of communications technologies, and in particular, to an authentication method, a content delivery network CDN, and a content server.

BACKGROUND

Usually, a content service provider (internet content provider, ICP) stores content resources (music, videos, and the like) in a cloud storage server, and when a client requests access a specific content resource, the client obtains the specific content resource from the cloud storage server. As access traffic increases, to relieve pressure on the cloud storage server, each ICP may allocate some content resources to node servers deployed at various positions. The node server is a content delivery network (Content Delivery Network, CDN). When a terminal device requests access a specific content resource, the terminal device may obtain the specific content resource from the CDN, thus relieving pressure on the cloud storage server.

Figure 1:
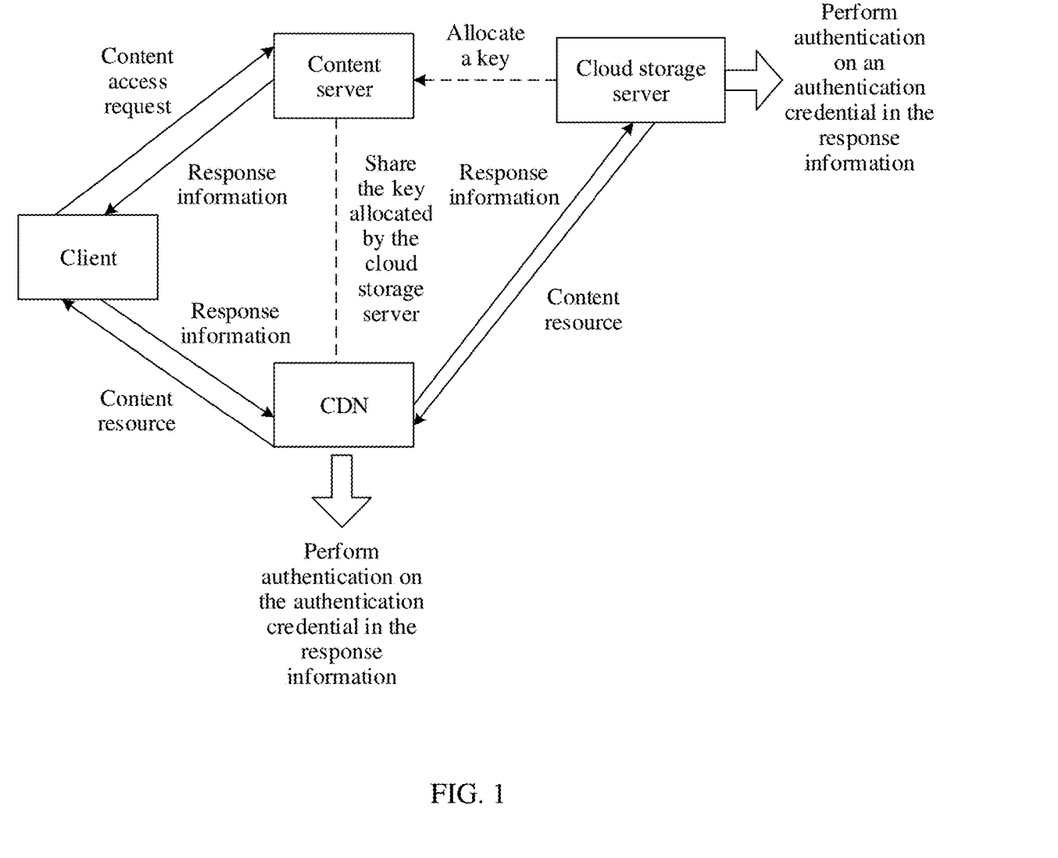
FIG. 1 is a schematic diagram of a content delivery process in the prior art.

FIG. 1 is a schematic diagram of a content delivery process in the prior art. In the process, a cloud storage server allocates a key to a content server, and then the content server and a CDN share the key. A process in which a client requests to access a specific content resource is as follows: The client sends a content access request to the content server, where the content access request is used to request to access the content resource. The content server sends back response information to the client, where the response information carries an authentication credential (Token), and the authentication credential is generated based on the key allocated by the cloud storage server. After receiving the response information, the client sends the response information to the CDN. The CDN performs authentication on the authentication credential in the response information. After the authentication credential passes the authentication, if the content resource is stored in the CDN, the CDN sends back the content resource to the client. If the content resource does not exist in the CDN, the CDN sends the response information to the cloud storage server. The cloud storage server performs authentication on the authentication credential in the response information. After the authentication credential passes the authentication, the cloud storage server sends back the content resource to the CDN, and the CDN then sends back the content resource to the client.

Usually, there is a comparatively large quantity of CDNs, security of the CDNs is comparatively low, and the content server shares the key allocated by the cloud storage server with each CDN. In this case, when any CDN is attacked by an intruder and a key is consequently leaked, content resources stored in the cloud storage server are threatened.

SUMMARY

Embodiments of this application provide an authentication method, a content delivery network CDN, and a content server, so as to improve security of content resources stored in a cloud storage server.

According to a first aspect, an embodiment of this application provides an authentication method, and the method is applicable to a content delivery network CDN. The method includes: receiving, by a content delivery network CDN, a content access request sent by a client, where the content access request is used to request to access a content resource, the content access request carries a first authentication credential and a second authentication credential, the first authentication credential is generated by a content server based on a first key allocated by the CDN, and the second authentication credential is generated by the content server based on a second key allocated by a cloud server; performing, by the CDN, authentication on the first authentication credential by using the first key; determining, by the CDN, that the first authentication credential passes the authentication and that the content resource is not stored in the CDN; sending, by the CDN, the content access request to the cloud server; receiving, by the CDN, a content resource sent by the cloud server, where the content resource is a content resource sent by the cloud server to the CDN after the cloud server performs authentication on the second authentication credential in the content access request by using the second key and determines that the second authentication credential passes the authentication; and sending, by the CDN, the content resource to the client.

In this embodiment of this application, the CDN and the cloud server separately allocate different keys to the content server. The content server generates the first authentication credential based on the first key allocated by the CDN, and generates the second authentication credential based on the second key allocated by the cloud server. The content access request that is sent by the client and that is received by the CDN carries the first authentication credential and the second authentication credential. The CDN performs authentication on the first authentication credential by using the first key. If the first authentication credential passes the authentication, and the content resource requested by the client is not stored in the CDN, the CDN sends the content access request to the cloud server. After performing authentication on the second authentication credential by using the second key and determining that the second authentication credential passes the authentication, the cloud server sends the content resource to the CDN. The CDN then sends the content resource to the client. In this process, even if the CDN is attacked by an intruder, and the key of the CDN is consequently leaked, the cloud server is not affected. This is because the key of the CDN and the key of the cloud server are not the same, thereby helping improve security of content resources stored in the cloud server.

In a possible design, the CDN determines that the first authentication credential passes the authentication and that the content resource is stored in the CDN, and the CDN sends the content resource to the client.

In this embodiment of this application, the CDN performs authentication on the first authentication credential by using the first key. After the first authentication credential passes the authentication, if the content resource requested by the client is stored in the CDN, the CDN sends back the content resource to the client. In this case, authentication on the second authentication credential is not performed using the cloud server, thereby helping reduce a delay caused when the client obtains the content resource.

In a possible design, the content access request further carries a valid time period, and before the CDN performs authentication on the first authentication credential by using the first key, the CDN determines that a time at which the content access request is received is within the valid time period.

In this embodiment of this application, the first authentication credential is valid within the valid time period. If the CDN determines that the time at which the content access request is received is within the valid time period, the CDN may continue to perform authentication on the first authentication credential. In other words, if the CDN determines that the time at which the content access request is received is not within the valid time period, the CDN does not perform authentication on the first authentication credential. In this manner, the CDN can preliminarily determine whether the first authentication credential is valid, to improve accuracy of the authentication performed on the first authentication credential.

In a possible design, the content access request further carries a content file path and a content number that are of the content resource, the first authentication credential includes a first signature, and the performing, by the CDN, authentication on the first authentication credential by using the first key includes: generating, by the CDN, a second signature based on an encryption algorithm and an input parameter, where the input parameter includes the first key, the file content path, the content number, and the valid time period, and the encryption algorithm is an algorithm the same as an encryption algorithm used when the content server generates the first authentication credential based on the first key allocated by the CDN; comparing, by the CDN, whether the first signature and the second signature are the same; and if the first signature and the second signature are the same, determining, by the CDN, that the first authentication credential passes the authentication.

In this embodiment of this application, the first authentication credential includes the first signature. After receiving the content access request, the CDN re-generates the second signature based on the input parameter in the content access request, the first key, and the encryption algorithm. The CDN compares the first signature and the second signature. If the first signature and the second signature are the same, the first authentication credential passes the authentication. In this manner, the CDN performs the authentication on the first authentication credential (generated based on the first key) by using the first key, thereby helping improve security of content resources stored in the CDN.

According to a second aspect, an embodiment of this application provides an authentication method, and the method is applicable to a content server. The method includes: receiving, by a content server, a first content access request sent by a client, where the first content access request is used to request to access a content resource; and sending back, by the content server, a second content access request to the client, where the second content access request carries a first authentication credential and a second authentication credential; the first authentication credential is generated by the content server based on a first key allocated by a CDN, and the second authentication credential is generated by the content server based on a second key allocated by a cloud server; the first authentication credential is used for the CDN to determine, after the CDN performs authentication on the first authentication credential by using the first key and determines that the first authentication credential passes the authentication, whether the content resource is stored in the CDN; and when the CDN determines that the content resource is not stored in the CDN after the CDN performs authentication on the first authentication credential and determines that the first authentication credential passes the authentication, the second authentication credential is used for the cloud server to send, after the cloud server performs authentication on the second authentication credential by using the second key and determines that the second authentication credential passes the authentication, the content resource to the client.

In this embodiment of this application, the CDN and the cloud server separately allocate different keys to the content server. The content server generates the first authentication credential based on the first key allocated by the CDN, and generates the second authentication credential based on the second key allocated by the cloud server. The CDN performs authentication on the first authentication credential by using the first key. After the first authentication credential passes the authentication, if the content resource requested by the client is not stored in the CDN, the cloud server performs authentication on the second authentication credential by using the second key. After the second authentication credential passes the authentication, the cloud server sends the content resource to the client. In this process, even if the CDN is attacked by an intruder, and the key of the CDN is consequently leaked, the cloud server is not affected. This is because the key of the CDN and the key of the cloud server are not the same, thereby helping improve security of content resources stored in the cloud server.

In a possible design, that the content server generates the first authentication credential based on the first key includes: generating, by the content server, a first signature based on the first key, a content file path and a content number that are of the content resource, a first valid time period, and a first encryption algorithm, where the first encryption algorithm is an algorithm allocated by the CDN, and the first valid time period is used to indicate a time period within which the first authentication credential is valid; and generating, by the content server, the first authentication credential based on the first signature.

In this embodiment of this application, the content server generates the first authentication credential based on an input parameter (including the content file path and the content number that are of the content resource, and the first valid time period) and the first key and the first encryption algorithm that are allocated by the CDN. The CDN may perform authentication on the first authentication credential, and the CDN sends the content resource to the client only after the first authentication credential passes the authentication, thereby helping improve security of content resources stored in the CDN.

In a possible design, that the content server generates the second authentication credential based on the second key includes: generating, by the content server, a second signature based on the second key, a content file path and a content number that are of the content resource, a second valid time period, and a second encryption algorithm, where the second encryption algorithm is an algorithm allocated by the cloud server, and the second valid time period is used to indicate a time period within which the second authentication credential is valid; and generating, by the content server, the second authentication credential based on the second signature.

In this embodiment of this application, the content server generates the second authentication credential based on an input parameter (including the content file path and the content number that are of the content resource, and the first valid time period) and the second key and the second encryption algorithm that are allocated by the cloud server. The cloud server may perform authentication on the second authentication credential, and the cloud server sends the content resource to the client only after the second authentication credential passes the authentication, thereby helping improve security of content resources stored in the cloud storage server.

In a possible design, the first encryption algorithm is one of a symmetric encryption algorithm, an asymmetric encryption algorithm, a hash algorithm, or an HMAC algorithm, and the second encryption algorithm is one of a symmetric encryption algorithm, an asymmetric encryption algorithm, a hash algorithm, or an HMAC algorithm.

In this embodiment of this application, the first encryption algorithm and the second encryption algorithm may alternatively be another algorithm, and the foregoing several algorithms are merely examples. This is not limited in this embodiment of this application.

According to a third aspect, a content delivery network CDN is provided. The content delivery network CDN has functions of implementing the content delivery network CDN in the foregoing method design. These functions may be implemented by hardware, or may be implemented by hardware by executing corresponding software. The hardware or software includes one or more units corresponding to the foregoing functions.

In a possible design, a specific structure of the content delivery network CDN may include a receiver, a processor, and a transmitter. The receiver, the processor, and the transmitter may perform corresponding functions in the method provided in any one of the first aspect or the possible designs of the first aspect.

According to a fourth aspect, a content server is provided. The content server has functions of implementing the content server in the foregoing method design. These functions may be implemented by hardware, or may be implemented by hardware by executing corresponding software. The hardware or software includes one or more units corresponding to the foregoing functions.

In a possible design, a specific structure of the content server may include a receiver and a transmitter. The receiver and the transmitter may perform corresponding functions in the method provided in any one of the second aspect or the possible designs of the second aspect.

According to a fifth aspect, an embodiment of this application provides a content delivery network CDN, including a processor and a memory, where the memory is configured to store one or more computer programs, and when the one or more computer programs stored in the memory are executed by the processor, the content delivery network CDN is enabled to implement the method in any one of the first aspect or the possible designs of the first aspect.

According to a sixth aspect, an embodiment of this application provides a content server, including a processor and a memory, where the memory is configured to store one or more computer programs, and when the one or more computer programs stored in the memory are executed by the processor, the content server is enabled to implement the method in any one of the second aspect or the possible designs of the second aspect.

According to a seventh aspect, an embodiment of this application further provides a computer readable storage medium, where the computer readable storage medium includes a computer program, and when the computer program runs on a content delivery network CDN, the content delivery network CDN is enabled to perform the method in any one of the first aspect or the possible designs of the first aspect.

According to an eighth aspect, an embodiment of this application further provides a computer readable storage medium, where the computer readable storage medium includes a computer program, and when the computer program runs on a content server, the content server is enabled to perform the method in any one of the second aspect or the possible designs of the second aspect.

According to a ninth aspect, an embodiment of this application further provides a computer program product including an instruction, where when the computer program product runs on a content delivery network CDN, the content delivery network CDN is enabled to perform the method in any one of the first aspect or the possible designs of the first aspect.

According to a tenth aspect, an embodiment of this application further provides a computer program product including an instruction, where when the computer program product runs on a content server, the content server is enabled to perform the method in any one of the second aspect or the possible designs of the second aspect.

DESCRIPTION OF EMBODIMENTS

The following describes the technical solutions in the embodiments of this application with reference to the accompanying drawings in the embodiments of this application.

In the following, some terms in this application are described, so as to help a person skilled in the art have a better understanding.

A client in the embodiments of this application is, for example, a device such as a smartphone, a tablet computer, a palmtop computer, a wearable device of any category, a vehicle-mounted device, or a computer. For example, the client is a smartphone. Various application programs may be installed on the smartphone to implement different functions. Certainly, the client may alternatively be a server used for a specific function, for example, a server used for storing data; may be a device on which client software is installed, where the device may be a computer, a terminal device, or the like; or may be a logical concept, for example, a software module or a virtual machine implemented through virtualization. This is not limited in the embodiments of this application.

In the embodiments of this application, the client may be alternatively referred to by another name, for example, a terminal device or user equipment (user equipment, UE). In other words, a name of the client is not limited in the embodiments of this application.

An application program in the embodiments of this application is a computer program that completes one or more pieces of specific work. A smartphone is used as an example. When running a computer program of an application program, the smartphone may display a display interface of the application program. On the display interface, man-machine interaction may be implemented. Usually, an application program may implement a specific function. For example, the application program includes, for example, a short message application, a multimedia messaging application, various mailbox applications, WeChat, Tencent chat software (QQ), WhatsApp Messenger, Line (Line), photo sharing (instagram), Kakao Talk, or DingTalk.

A content server in the embodiments of this application is a content service provider that provides specific network content resources, for example, JD, Amazon, Taobao, or Sina.

In the embodiments of this application, the content server may be alternatively referred to by another name, for example, a content service provider, a network content supplier, or a network content provider. In other words, a name of the content server is not limited in the embodiments of this application, provided that the foregoing meaning is expressed.

A content delivery network in the embodiments of this application is a node server deployed at a place. A content service provider may place different content resources in different CDNs. For example, the content service provider is JD. JD may allocate a content resource (for example, commodity information) whose shipping point is Chengdu to a CDN located in Chengdu. When accessing the content resource, a user in Chengdu may obtain the content resource from the CDN located in Chengdu.

A cloud storage server in the embodiments of this application is a server used to store content resources. Usually, a content service provider stores all content resources on a cloud storage server. The content resources may be of a plurality of types, for example, music, videos, or images. In the embodiments of this application, the cloud storage server may be alternatively referred to by another name, for example, a cloud server or a cloud. In other words, a name of the cloud storage server is not limited in the embodiments of this application, provided that the foregoing meaning is expressed.

"A plurality of" in the embodiments of this application means two or more than two.

In addition, it should be understood that in a description in this application, words such as "first" and "second" are merely used for a purpose of distinguishing between descriptions, and should neither be understood as indicating or implying relative importance nor be understood as indicating or implying an order.

Figure 2:
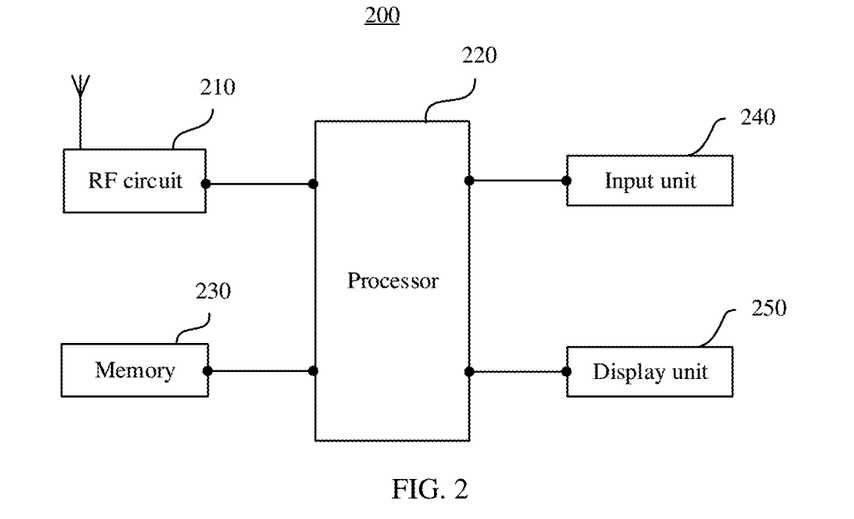
FIG. 2 is a schematic structural diagram of a client according to an embodiment of this application.

The following describes a possible structure of a client. For example, the client is a smartphone. FIG. 2 is a schematic structural diagram of a smartphone. Referring to FIG. 2, the mobile phone 200 includes a radio frequency (Radio Frequency, RF) circuit 210, a processor 220, a memory 230, an input unit 240, and a display unit 250. A person skilled in the art may understand that a mobile phone structure shown in FIG. 2 does not constitute any limitation on the mobile phone. The mobile phone provided in this embodiment of this application may include components more or fewer than those shown in the figure, or some components are combined, or the components are disposed differently.

The following describes each component of the mobile phone 200 in detail with reference to FIG. 2.

The RF circuit 210 may be configured to receive and send data in a communication or call process. The mobile phone 200 may exchange information with a content server or a CDN by using the RF circuit 210. For example, the mobile phone 200 may send a content access request to the content server by using the RF circuit 210, and receive, by using the RF circuit 210, information fed back by the content server, and the like. The RF circuit 210 usually includes but is not limited to an antenna, at least one amplifier, a transceiver, a coupler, a low noise amplifier (Low Noise Amplifier, LNA), and a duplexer.

In addition, the RF circuit 210 may perform wireless communication with a content server or a CDN. Any communication standard or protocol may be used for the wireless communication, including but not limited to: global system for mobile communications (Global System of Mobile communication, GSM), general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), email, and short message service (Short Messaging Service, SMS).

The memory 230 may be configured to store a software program and/or a module that are/is of each application program. By running the software program and/or the module that are/is of a specific application program and that are/is stored in the memory 230, the processor 220 runs the application program and implements a specific function.

Optionally, the memory 230 may mainly include a program storage area and a data storage area. The program storage area may store an operating system, software programs and/or modules of various application programs (for example, WeChat and QQ), and the like. The data storage area may store data (for example, multimedia files such as various pictures and video files) created during use of the mobile phone 200, and the like.

In addition, the memory 230 may include a high-speed random access memory, and may further include a nonvolatile memory, for example, at least one magnetic disk storage device or a flash memory device, or another volatile solid-state storage device.

The processor 220 is a control center of the mobile phone 200, is connected to all the parts by using various interfaces and lines, and by running or executing a software program and/or a module that are/is stored in the memory 230 and by invoking data stored in the memory 230, performs various functions and data processing of the mobile phone 200, so as to implement a plurality of services that are based on the mobile phone 200.

The display unit 250 may be configured to display information entered by a user or information provided for a user, and various menus of the mobile phone 200. The display unit 250 is a display system of the mobile phone 200, and is configured to present an interface to implement man-machine interaction. The display unit 250 may include a display panel. Optionally, the display panel may be configured in a form of a liquid crystal display (Liquid Crystal Display, LCD), an organic light-emitting diode (Organic Light-Emitting Diode, OLED), or the like.

For example, the mobile phone 200 runs a JD app and interacts with a content server. The memory 230 stores a software program and/or a module that are/is of the JD app. After a user triggers an icon of the JD app in the mobile phone 200 by using the input unit 240 (for example, a touchscreen), the processor 220 runs the software program and/or the module that are/is of the JD app and that are/is stored in the memory 230, to open the JD app and display a display interface of the JD app on the display unit 250. When the processor 220 detects that the user triggers an operation of touching a specific commodity on the display interface, the processor 220 generates a first content access request, where the first content access request is used to request to access a content resource (for example, commodity information) of the commodity. The RF circuit 210 sends the content access request to a content server of JD. Then, the mobile phone 200 receives, by using the RF circuit 210, a second content access request fed back by the content server, where the second content access request carries a first authentication credential and a second authentication credential. Roles of the first authentication credential and the second authentication credential are described later.

The mobile phone 200 shown in FIG. 2 may further include other components, for example, a Wi-Fi module, a communications interface, a display unit, a camera, a power supply, at least one sensor, and an audio circuit, although they are not shown. Details are not described herein.

Figure 3:
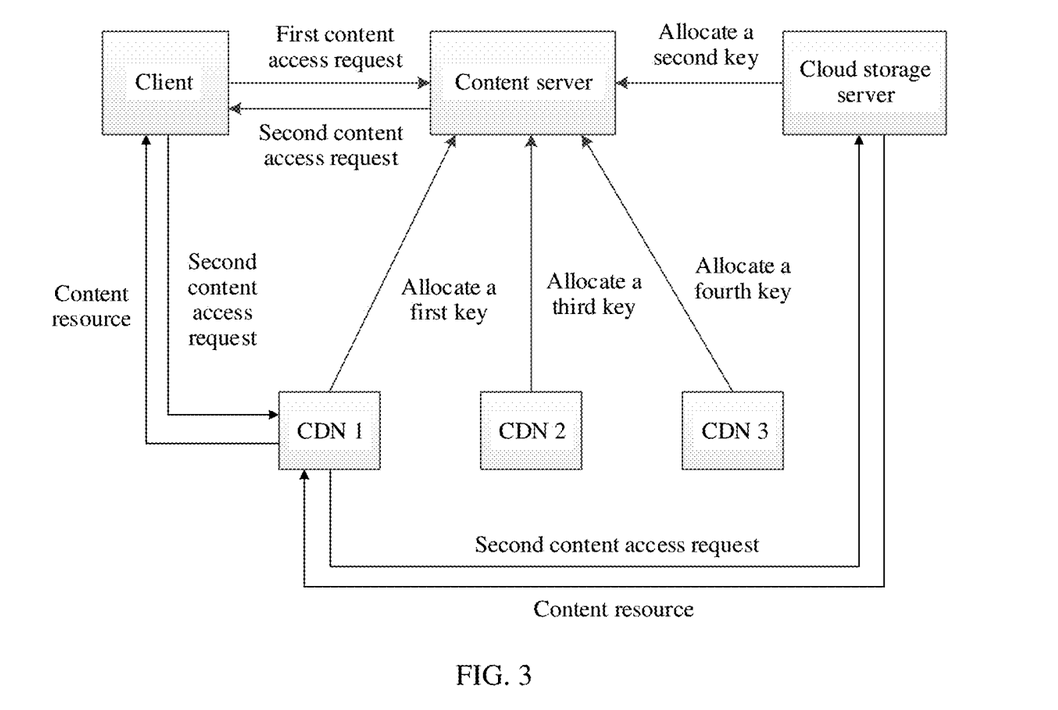
FIG. 3 is a schematic diagram of an application scenario according to an embodiment of this application.

FIG. 3 is a schematic diagram of an application scenario according to an embodiment of this application. As shown in FIG. 3, the application scenario includes a client, a content server, a cloud storage server, and at least one CDN (FIG. 3 uses an example in which there are three CDNs, namely, a CDN 1, a CDN 2, and a CDN 3). Certainly, FIG. 3 may be alternatively understood as a schematic diagram of information exchange between a content server, a cloud storage server, a client, and at least one CDN. The client in FIG. 3 may be the mobile phone 200 shown in FIG. 2. Usually, the content server may store all content resources in the cloud storage server, and store some content resources in different CDNs.

As shown in FIG. 3, each CDN allocates a key to the content server. For example, the CDN 1 allocates a first key to the content server, the CDN 2 allocates a third key to the content server, the CDN 3 allocates a fourth key to the content server, and the cloud storage server allocates a second key to the content server.

When the client has to access a specific content resource, the client sends a first content access request to the content server, where the first content access request is used to request the content resource (in the foregoing content, an example in which the client is the mobile phone 200 and the JD app is used as an example is already provided, and details are not described herein again). The content server determines, based on the first content access request, a CDN corresponding to the first content access request (a specific process is described later). For example, the CDN corresponding to the first content access request is the CDN 1. The content server generates a first authentication credential based on the first key allocated by the CDN 1, and the content server generates a second authentication credential based on the second key allocated by the cloud storage server. Then, the content server sends back a second content access request to the client, where the second content access request carries the first authentication credential and the second authentication credential.

The client forwards the second content access request to the CDN 1, and the CDN 1 performs authentication on the first authentication credential by using the first key. When the first authentication credential passes the authentication, if the content resource is stored in the CDN 1, the CDN 1 sends the content resource to the client. When the first authentication credential passes the authentication, if the content resource does not exist in the CDN 1, the CDN 1 sends the second content request to the cloud storage server. The cloud storage server performs authentication on the second authentication credential by using the second key. If the second authentication credential passes the authentication, the cloud storage server sends the content resource to the CDN 1. The CDN 1 sends the content resource to the client.

It can be learned from the foregoing description that in this embodiment of this application, each CDN of the at least one CDN allocates a key to the content server, and the cloud storage server also allocates a key to the content server. The key allocated by the cloud storage server to the content server and the key allocated by each CDN to the content server may be different. In this case, even if a specific CDN is attacked by an intruder, and the key of the CDN is consequently leaked, the cloud storage server is not affected. This is because the key of the specific CDN and the key of the cloud storage server are not the same. This manner helps improve security of content resources stored in the cloud storage server.

Figure 4A:
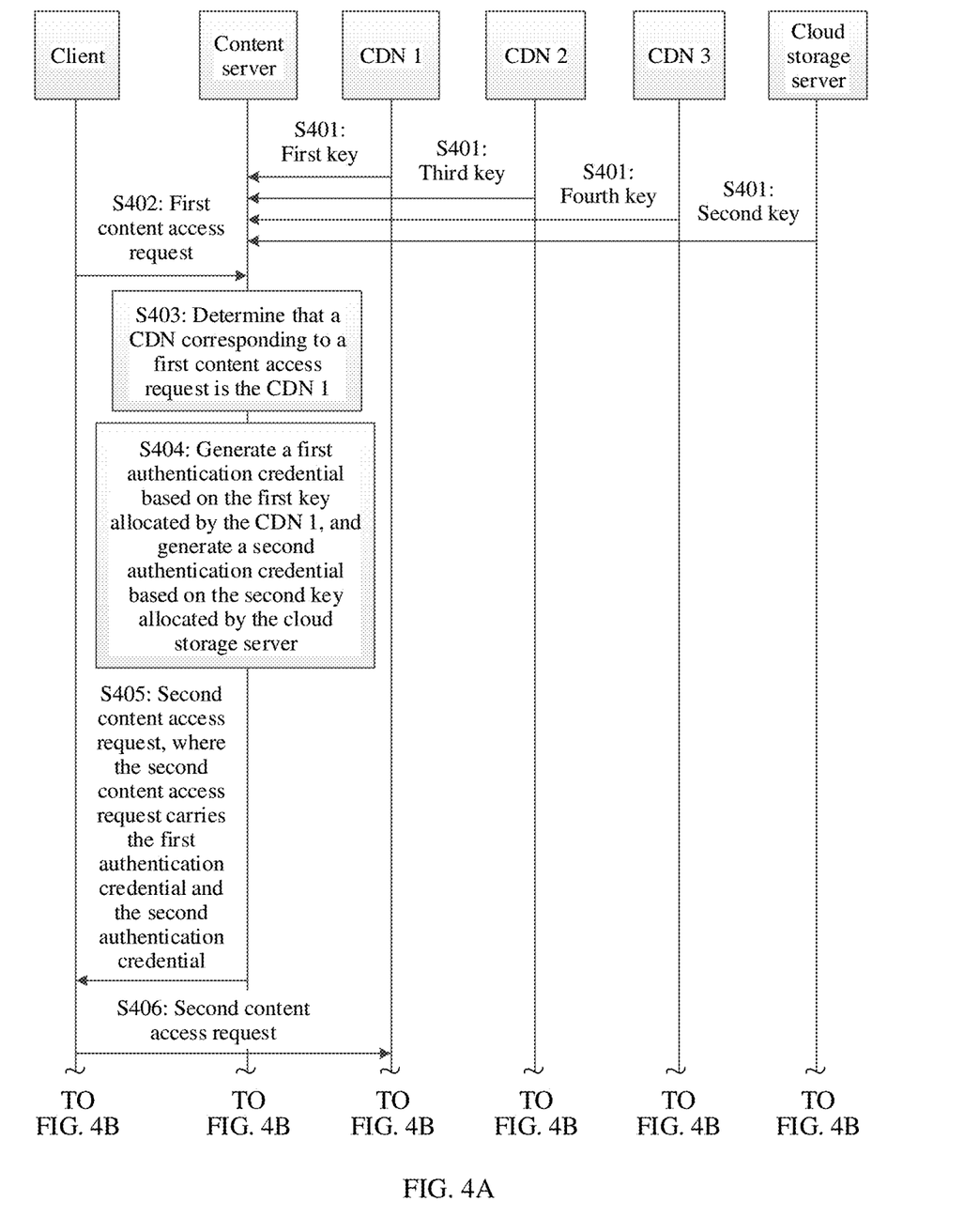
FIG. 4A and FIG. 4B are a schematic flowchart of an authentication method according to an embodiment of this application.
Figure 4B:
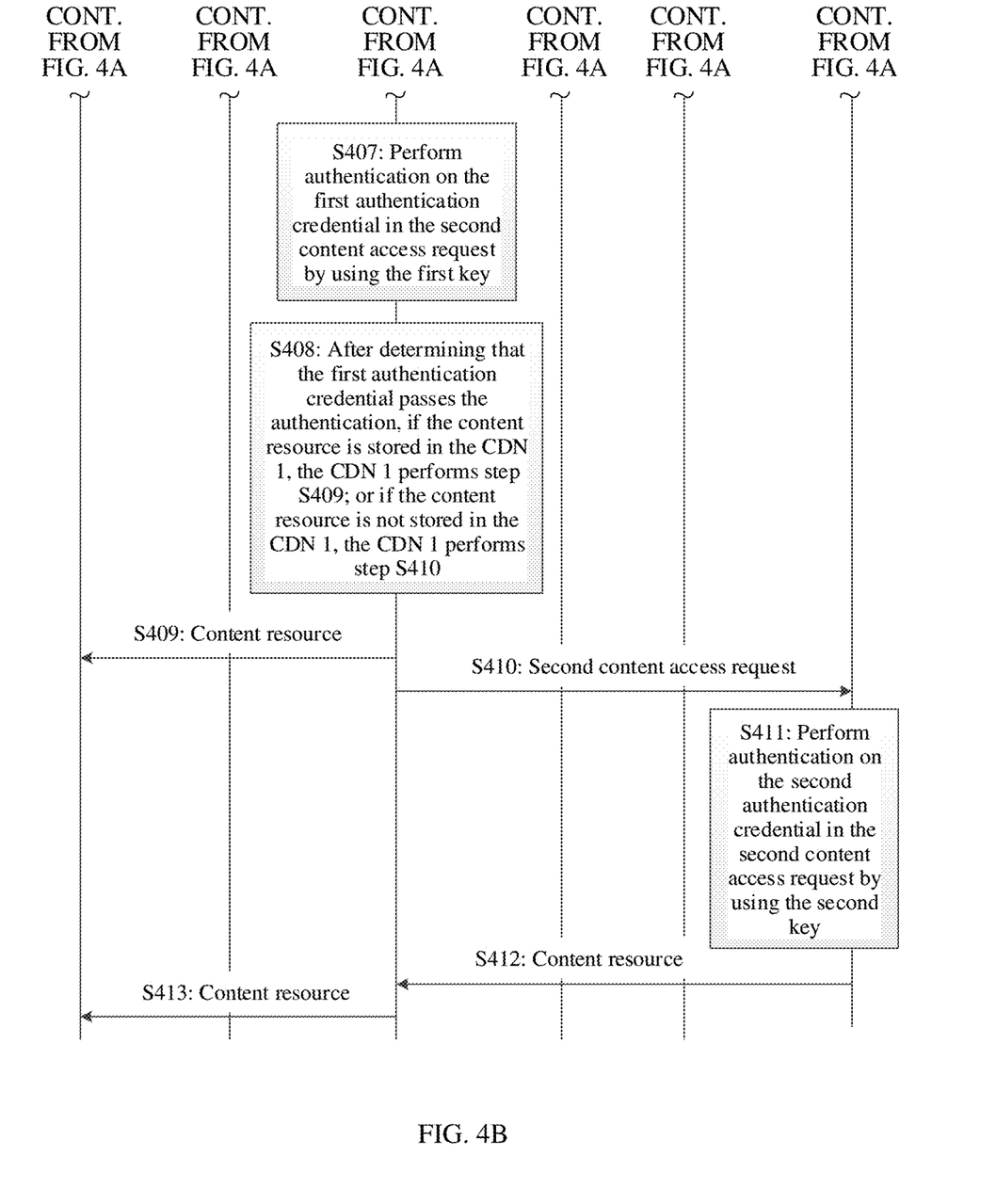

FIG. 4A and FIG. 4B are a flowchart of an authentication method according to an embodiment of this application. The method may be applicable to the application scenario shown in FIG. 3 or a similar application scenario. The following uses the application scenario shown in FIG. 3 as an example for description. As shown in FIG. 4A and FIG. 4B, the procedure includes the following steps.

S401: The CDN 1 allocates a first key to the content server, the CDN 2 allocates a third key to the content server, the CDN 3 allocates a fourth key to the content server, and the cloud storage server allocates a second key to the content server.

It should be noted that although operations of allocating a key to the content server by each CDN and the cloud storage server in FIG. 4A and FIG. 4B are all represented by S401, in an actual application process, each CDN and the cloud storage server may or may not simultaneously allocate a key to the content server.

In this embodiment of this application, S401 may be performed periodically. In other words, each CDN and the cloud storage server may periodically allocate a key to the content server. For example, the cloud storage server and each CDN may separately allocate a key to the content server at specific intervals. An allocation period of the cloud storage server and an allocation period of a CDN may be the same or different. Certainly, S401 may be alternatively performed only once. For example, the cloud storage server and each CDN allocate a key to the content server at first use, and do not have to allocate a key to the content server again in a subsequent use process.

S402: The client sends a first content access request to the content server, and correspondingly, the content server receives the first content access request sent by the client.

For example, the client is a mobile phone. When a user uses an app in the mobile phone, the mobile phone may generate a content access request. When the user uses different apps, content access requests generated by the mobile phone are different. For example, the app is a music player. After the user enters, in an input box of a display interface of the music player, a specific piece of music to be searched and touches a search button, the mobile phone generates a first content access request. The first content access request is used to request to access a content resource (that is, the piece of music).

In this embodiment of this application, after receiving the first content access request sent by the client, the content server may verify validity of the client. For example, the client is a mobile phone. A first content access request generated by the mobile phone may carry device identification information of the mobile phone. The device identification information may be used to indicate whether the mobile phone is an authorized user. The device identification information may include a device identifier, an IP address, a MAC address, and the like that are of the mobile phone. After receiving the first content access request sent by the mobile phone, the content server may verify, by using the device identification information carried in the first content access request, whether the mobile phone is an authorized user. When verifying that the mobile phone is an unauthorized user, the content server sends back response information to the mobile phone. The response information is used to indicate that content access fails, and the mobile phone does not have to proceed to a subsequent step. If the content server verifies that the mobile phone is an authorized user, the content server proceeds to a subsequent step.

For another example, the first content access request generated by the mobile phone may further carry information about an account that currently logs in to an app and information about a subscribed service. For example, the client is a mobile phone. When using an app in the mobile phone, a user may register an account and subscribe to, by using the account, a specific service provided by the app. If the mobile phone detects that a specific service in the app is triggered and generates a first content access request, the first content service request may carry information about an account that currently logs in to the app and information about a service subscribed to by the account information. After receiving the first content access request, the content server provides a corresponding content resource for the mobile phone based on the account information and the information about a subscribed service. For example, the user registers an account in an iQIYI app and subscribes to a VIP service. When the user touches a specific movie requiring VIP rights on a display interface of the iQIYI app, the mobile phone sends a first content access request to a content server, where the first content access request requests to access the movie, and the first content access request carries information about the account and information about the subscribed service. The content server provides the movie to the user based on the information about the account and the information about the subscribed service. If the mobile phone does not subscribe to the VIP service, the first content access request does not have information about the subscribed service. The content server determines, based on the account information of the mobile phone, that the mobile phone does not subscribe to the service, and the content server may send back response information to the mobile phone, where the response information is used to indicate that the content resource cannot be accessed.

For another example, the first content access request generated by the mobile phone may further carry a content number of a content resource requested to be accessed. The content number is used to identify the content resource. A music player in the mobile phone is used as an example. Among pieces of music presented on a display interface of the music player, each piece of music has a number. When the user triggers a specific piece of music, the mobile phone may determine a number of the piece of music, and add the number to the first content access request. Use of the content number is described later.

S403: The content server determines a CDN corresponding to the first content access request.

In this embodiment of this application, S403 may be implemented in a plurality of manners. In a possible implementation, when allocating content resources to the CDNs, the content server may establish a mapping relationship between the content resources and the CDNs. After receiving the first content access request, the content server determines, according to the mapping relationship, a CDN corresponding to the content resource requested by the first content access request. In still another possible implementation, it can be learned from the foregoing content that the first content access request may carry an IP address, and therefore, the content server may store a mapping relationship between an IP address and a CDN. After receiving the first content access request, the content server determines, according to the mapping relationship, a CDN corresponding to the IP address carried in the first content access request. In this manner, different CDNs may manage different clients. In another possible implementation, the first content access request may further carry information about a current geographic location of the client, and therefore, the content server may store a mapping relationship between information about a geographic location of the client and a CDN. After receiving the first content access request, the content server determines, according to the mapping relationship, a CDN corresponding to the geographic location. In this manner, the content server may determine, based on the information about the current geographic location of the client, a CDN suitable for the first content access request sent by the client.

In the following description, an example in which the content server determines that the CDN corresponding to the content resource requested by the first content access request is the CDN 1 is used for description.

It can be learned from the foregoing content that the content server stores keys allocated by the CDNs. Therefore, when the content server determines that the CDN corresponding to the content resource requested by the first content access request is the CDN 1, the content server may generate a first authentication credential based on the first key allocated by the CDN 1, that is, perform S404.

S404: The content server generates the first authentication credential based on the first key allocated by the CDN 1, and generates a second authentication credential based on the second key allocated by the cloud storage server.

The following separately describes processes in which the content server generates the first authentication credential and the second authentication credential. It should be noted that the processes, described below, in which the content server generates the first authentication credential and the second authentication credential are merely an example instead of a limitation. In actual application, the content server may alternatively generate the first authentication credential and the second authentication credential in another manner. This is not limited in this embodiment of this application.

1. A process in which the content server generates the first authentication credential based on the first key is as follows.

Step 1: The content server determines a first content file path of the content resource requested by the first content access request. Step 2: The content server establishes a first valid time period. Step 3: The content server generates a first signature based on an input parameter and a first encryption algorithm, where the input parameter includes the first content file path, the content number, the first key, and the first valid time period. Step 4: The content server generates the first authentication credential based on the first signature.

It should be noted that the content server may store a mapping relationship between a content resource and a content file path. For example, if the content resource requested by the first content access request is a song, the content server determines a content file path of the song according to the mapping relationship between a content resource and a content file path. Therefore, in step 1, after receiving the first content access request, the content server may determine the first content file path of the content resource requested by the first content server.

In step 2, the content server may set the first valid time period. The first valid time period may be understood as a time period within which the first authentication credential is valid. An order in which step 2 and step 1 are performed is not limited.

In step 3, the first encryption algorithm used by the content server may be an encryption algorithm allocated by the CDN 1. It should be noted that in addition to allocating a key to the content server, each CDN may further allocate an encryption algorithm to the content server. Different CDNs may allocate different encryption algorithms to the content server. Certainly, the first encryption algorithm may alternatively not be the encryption algorithm allocated by the CDN 1, and another encryption algorithm is used. For example, the first encryption algorithm is an encryption algorithm preset by the CDN 1.

Optionally, the first encryption algorithm may be a symmetric encryption algorithm, an asymmetric encryption algorithm, a hash algorithm, an HMAC algorithm, or the like. For example, the first encryption algorithm is the hash algorithm. In this case, the content server generates the first signature based on the hash algorithm and the input parameter. The input parameter may include the first valid time period, the first content file path, the content number, and the first key.

In step 4, the content server generates the first authentication credential based on the first signature. Usually, the first authentication credential includes two fields. The first field is the first signature, and the second field is the first valid time; or the first field may be the first valid time, and the second field may be the first signature.

2. A process in which the content server generates the second authentication credential based on the second key is as follows.

Step 1: The content server determines a first content file path of the content resource requested by the first content access request. Step 2: The content server establishes a second valid time period. Step 3: The content server generates a second signature based on an input parameter and a second encryption algorithm, where the input parameter includes the first content file path, the content number, the second key, and the second valid time period. Step 4: The content server generates the second authentication credential based on the second signature.

Step 1 is similar to step 1 in the foregoing process in which the content server generates the first authentication credential based on the first key, and details are not described again. In step 2, the second valid time period may be the same as or different from the first valid time period. If the second valid time period is different from the first valid time, the second valid time period may be longer than the first valid time period. In step 3, the second encryption algorithm may be an encryption algorithm allocated by the cloud storage server to the content server, or may be another encryption algorithm.

S405: The content server sends a second content access request to the client, where the second content access request carries the first authentication credential and the second authentication credential, and correspondingly, the client receives the second content access request.

In this embodiment of this application, in addition to the first authentication credential and the second authentication credential, the second content access request further carries other information, for example, a content file access uniform resource locator (uniform resource locator, URL) (including the first content file path and the content number) and CDN identification information of the CDN 1. The content file access URL is used to indicate an access address of the content resource in a CDN. A role of the other information carried in the second content access request is described later.

S406: The client sends the second content access request to the CDN 1, and correspondingly, the CDN 1 receives the second content access request sent by the client.

It can be learned from the foregoing content that the second content access request may further carry the CDN identification information of the CDN 1. Therefore, after receiving the second content access request, the client can learn, by identifying the CDN identification information of the CDN 1, that the second content access request is to be sent to the CDN 1.

S407: After receiving the second content access request, the CDN 1 performs authentication on the first authentication credential by using the first key.

It should be noted that to help the CDN 1 identify the first authentication credential in the second content access request, the content server may set an authentication credential identifier for the first authentication credential and the second authentication credential in a process of generating the first authentication credential and the second authentication credential. For example, the authentication credential identifier may be a name of an authentication credential (for example, a name of the first authentication credential is token1, and a name of the second authentication credential is token2). The authentication credential identifier may be alternatively expressed in binary. An authentication credential whose authentication credential identifier is "1" is the first authentication credential generated by the content server based on the first key allocated by the CDN 1, and an authentication credential whose authentication credential identifier is "0" is the second authentication credential generated by the content server based on the second key allocated by the cloud storage server. Therefore, after receiving the second content access request, the CDN 1 may perform, by using the first key, authentication on the authentication credential whose authentication credential identifier is "1" (that is, the first authentication credential). The content server may alternatively set an authentication credential identifier only for the first authentication credential. To be specific, an authentication credential with an authentication credential identifier is the first authentication credential generated by the content server based on the first key allocated by the CDN 1, and an authentication credential without an authentication credential identifier is the second authentication credential generated by the content server based on the second key allocated by the cloud storage server. In this case, after receiving the second content access request, the CDN 1 may perform authentication on the authentication credential with an authentication credential identifier (that is, the first authentication credential) by using the first key.

The following describes a process in which the CDN 1 performs authentication on the first authentication credential by using the first key. It should be noted that the process, described below, in which the CDN 1 performs authentication on the first authentication credential by using the first key is merely an example instead of a limitation. In actual application, the CDN 1 may alternatively perform authentication on the first authentication credential in another manner. This is not limited in this embodiment of this application.

It can be learned from the foregoing content that the first authentication credential includes two fields, one of which is the first valid time period and the other of which is the first signature. Therefore, the CDN 1 may perform authentication on the first authentication credential in two steps. Step 1: The CDN 1 may determine whether a time at which the second content request is received is within the first valid time period. For example, assuming that the first valid time period is 10:00-10:05, if the CDN 1 receives the second content access request at 10:07, it indicates that the second content access request has expired, and the CDN 1 does not have to perform authentication on the first authentication credential. In this case, the CDN 1 may discard the second content access request, or send back response information to the client (the response information is used to indicate that the request has expired). When determining that the time at which the second content access request is received is within the first valid time period, the CDN 1 may proceed to step 2. Step 2: The CDN 1 determines whether the first signature is correct.

It can be learned from the foregoing content that the first signature is obtained through calculation performed by the content server based on the input parameter (including the first valid time period, the first content file path, and the first key) and the first encryption algorithm. Therefore, to verify whether the first signature is correct, in a possible implementation, the CDN 1 may perform re-calculation based on the input parameter and the first encryption algorithm to obtain a third signature, compare the third signature with the first signature, and determine whether the third signature is the same as the first signature. If the third signature is the same as the first signature, it indicates that the first signature is correct, that is, the first authentication credential passes the authentication; or if the third signature is not the same as the first signature, it indicates that the first signature is incorrect, that is, the first authentication credential does not pass the authentication.

When calculating the third signature, the CDN 1 uses the first encryption algorithm and the input parameter. Regarding the first encryption algorithm, it should be noted that, it can be learned from the foregoing content that the content server uses the first encryption algorithm when generating the first signature algorithm, and the first encryption algorithm may be allocated by the CDN 1 or may be preset by the CDN 1. If the content server uses, when generating the first signature algorithm, the first encryption algorithm allocated by the CDN 1, the CDN 1 also uses the first encryption algorithm when generating the second signature. If the content server does not use, when generating the first signature algorithm, the first encryption algorithm allocated by the CDN 1 but uses another algorithm, the second content access request may carry an algorithm identifier of the another algorithm. When receiving the second content access request, the CDN 1 determines, based on the algorithm identifier, the algorithm corresponding to the algorithm identifier, and when generating the second signature, also uses the determined algorithm corresponding to the algorithm identifier. In other words, the encryption algorithm used when the content server generates the first signature and the encryption algorithm used when the CDN 1 generates the third signature are a same algorithm.

Regarding the input parameter, it should be noted that, it can be learned from the foregoing content that the input parameter used when the content server generates the first signature includes the first content file path, the content number, the first key, and the first valid time period. The first key is allocated by the CDN 1 to the content server. Therefore, the CDN 1 knows the first key. The first valid time period is a field in the first authentication credential, and the first content file path and the content number are carried in the second content access request. Therefore, the CDN 1 may obtain the first content file path and the content number from the second content access request, and read the first valid time period in the first authentication credential. Then, the CDN 1 generates the third signature based on the first content file path, the content number, the first valid time period, the first key, and the first encryption algorithm.

It should be noted that if the client or the CDN 1 is attacked by an intruder, and the first content file path or the content number in the second content access request is consequently tampered with, the first content file path or the content number that the CDN 1 obtains from the second content access request is tampered with. In this case, a third signature generated by the CDN 1 based on the tampered first content file path, the tampered content number, the first valid time period, the first key, and the first encryption algorithm is different from the first signature. In other words, the first authentication credential does not pass the authentication. In this case, the CDN 1 may discard the second content access request, or send back, to the client, response information indicating that the content resource cannot be obtained.

If the first content file path and the content number in the second content access request are not tampered with, the third signature generated by the CDN 1 based on the first content file path, the content number, the first valid time period, the first key, and the first encryption algorithm is the same as the first signature. In other words, the first authentication credential passes the authentication.

S408: After the CDN 1 determines that the first authentication credential passes the authentication, if the content resource is stored in the CDN 1, the CDN 1 performs step S409; or if the content resource is not stored in the CDN 1, the CDN 1 performs step S410.

S409: The CDN 1 sends the content resource to the client.

In this embodiment of this application, the CDN 1 and the cloud storage server separately allocate different keys to the content server, the content server generates the first authentication credential based on the first key allocated by the CDN 1, and the CDN performs authentication on the first authentication credential by using the first key. After the first authentication credential passes the authentication, if the content resource requested by the client is stored in the CDN 1, the CDN 1 sends back the content resource to the client, and does not have to perform a subsequent step. For the client, this helps reduce a delay caused when the content resource is obtained. In addition, in this process, even if the key of the CDN 1 is leaked, content resources stored in the cloud storage server are not threatened.

S410: The CDN 1 sends the second content access request to the cloud storage server.

In this embodiment of this application, if the cloud storage server and the CDN 1 use a same domain name, the CDN 1 may forward the second content access request to the cloud storage server.

If the cloud storage server and the CDN 1 use different domain names, when sending the second content access request to the cloud storage server, the CDN 1 may replace a domain name of the content file access URL in the second content access request with a domain name of the cloud storage server. A content access URL obtained after the domain name replacement is used to indicate an access address of the content resource in the cloud storage server. Then, the CDN 1 sends the second content access request including the content file access URL obtained after the domain name replacement to the cloud storage server.

For example, before domain name replacement, a content file access URL is http://www.huawei.com/test/test.mp4, where www.huawei.com is a domain name of the CDN 1. After the CDN 1 replaces the domain name of the CDN 1 in the content file access URL with a domain name of the cloud storage server, a content file access URL obtained after the domain name replacement is http://myaccount.blob.core.windows.net/test/test.mp4, where myaccount.blob.core.windows.net is the domain name of the cloud storage server.

Optionally, the second content access request sent by the CDN 1 to the cloud storage server may not carry the first authentication credential.

S411: After receiving the second content access request, the cloud storage server performs authentication on the second authentication credential in the second content access request by using the second key.

The following describes a process in which the cloud storage server performs authentication on the second authentication credential by using the second key. It should be noted that the process, described below, in which the cloud storage server performs authentication on the second authentication credential by using the second key is merely an example instead of a limitation. In actual application, the cloud storage server may alternatively perform authentication on the second authentication credential in another manner. This is not limited in this embodiment of this application.

It can be learned from the foregoing content that the second authentication credential includes two fields, one of which is the second valid time period and the other of which is the second signature. Therefore, the cloud storage server may perform authentication on the second authentication credential in two steps. Step 1: The cloud storage server may determine whether a time at which the second content request is received is within the second valid time period. When determining that the time at which the second content access request is received is within the second valid time period, the cloud storage server may proceed to step 2. Step 2: The cloud storage server determines whether the second signature is correct.

It can be learned from the foregoing content that the second signature is obtained through calculation performed by the content server based on the input parameter (including the second valid time period, the first content file path, the content number, and the second key) and the second encryption algorithm. Therefore, to verify whether the second signature is correct, in a possible implementation, the cloud storage server may perform re-calculation based on the input parameter and the second encryption algorithm to obtain a fourth signature, compare the fourth signature with the second signature, and determine whether the fourth signature is the same as the second signature. If the fourth signature is the same as the second signature, it indicates that the second signature is correct, that is, the second authentication credential passes the authentication; or if the fourth signature is not the same as the second signature, it indicates that the second signature is incorrect, that is, the second authentication credential does not pass the authentication.

When calculating the fourth signature, the cloud storage server uses the second encryption algorithm and the input parameter. Regarding the second encryption algorithm and the input parameter, a process is similar to the foregoing process, in S407, in which the CDN 1 calculates the third signature. For brevity of the specification, details are not described herein again.

It should be noted that if the CDN 1 is attacked by an intruder, and the first content file path or the content number in the second content access request is consequently tampered with, the first content file path or the content number that the cloud storage server obtains from the second content access request is tampered with. In this case, a fourth signature generated by the cloud storage server based on the tampered first content file path, the tampered content number, the second valid time period, the second key, and the second encryption algorithm is different from the second signature. In other words, the second authentication credential does not pass the authentication. In this case, the cloud storage server may discard the second content access request, or send back, to the CDN 1, response information indicating that the content resource cannot be obtained. Then, the CDN 1 sends the response information to the client.

If the first content file path and the content number in the second content access request are not tampered with, the fourth signature generated by the cloud storage server based on the first content file path, the content number, the second valid time period, the second key, and the second encryption algorithm is the same as the second signature. In other words, the second authentication credential passes the authentication.

S412: After determining that the second authentication credential passes the authentication, the cloud storage server sends the content resource to the CDN 1.

S413: The CDN 1 sends the content resource to the client.

It can be learned from the foregoing description that the CDNs and the cloud storage server separately allocate different keys to the content server. Even if a CDN is attacked by an intruder, and a key of the CDN is consequently leaked, the cloud storage server is not affected, thereby helping improve security of content resources stored in the cloud storage server.

It can be learned from the foregoing description about the authentication method provided in this embodiment of this application that in this embodiment of this application, keys that the CDNs and the cloud service memory allocate to the content server are different. Even if a CDN is attacked by an intruder, and a key of the CDN is consequently leaked, the cloud storage server is not affected. This is because a key of the specific CDN and the key of the cloud storage server are not the same. This manner helps improve security of content resources stored in the cloud storage server. In addition, in this embodiment of this application, a CDN may perform authentication on the first authentication credential, thereby taking a part of workload of the cloud storage server. In addition, when the content resource requested by the client is stored in the CDN, the CDN sends the content resource to the client, provided that the CDN determines that the first authentication credential passes the authentication. This reduces a delay in receiving the content resource to some extent.

The implementations of this application may be combined arbitrarily, to implement different technical effects.

In the foregoing embodiments provided in this application, the method provided in the embodiments of this application is described from a perspective of that a content delivery network CDN and a content server work as an execution body. To implement the foregoing functions in the method provided in the embodiments of this application, the content delivery network CDN or the content server may include a hardware structure and/or a software module, and implement the foregoing functions in a form of the hardware structure, the software module, or a combination of the hardware structure and the software module. Whether a specific function among the foregoing functions is performed in a manner of the hardware structure, the software module, or a combination of the hardware structure and the software module depends on particular applications and design constraints of the technical solutions.

Figure 5:
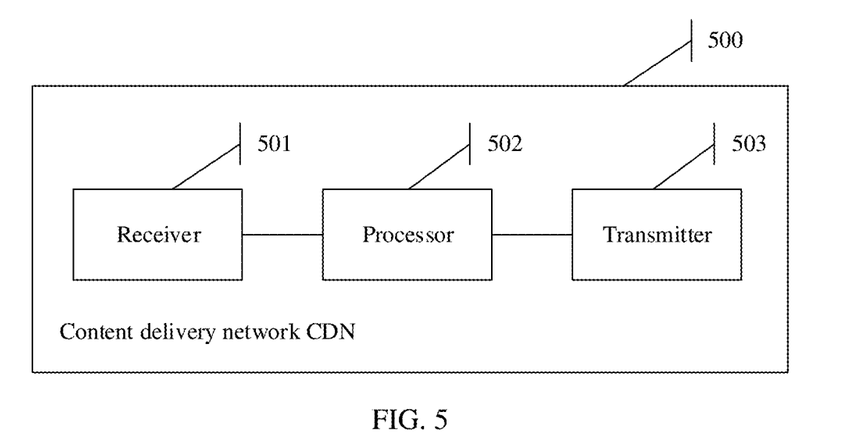
FIG. 5 is a schematic structural diagram of a content delivery network CDN according to an embodiment of this application.

Based on a same concept, FIG. 5 shows a content delivery network CDN 500 according to an embodiment of this application. As shown in FIG. 5, the content delivery network CDN 500 includes a receiver 501, a processor 502, and a transmitter 503. The receiver 501 may be configured to perform S406 and S412 in the embodiment shown in FIG. 4A and FIG. 4B, and/or configured to support another process of the art described in this specification. The processor 502 may be configured to perform S407 and S408 in the embodiment shown in FIG. 4A and FIG. 4B, and/or configured to support another process of the art described in this specification. The transmitter 503 may be configured to perform S409, S410, and S413 shown in FIG. 4A and FIG. 4B, and/or configured to support another process of the art described in this specification. All related content of the steps in the foregoing method embodiments may be cited as function descriptions of corresponding functional modules, and details are not described herein again.

Figure 6:
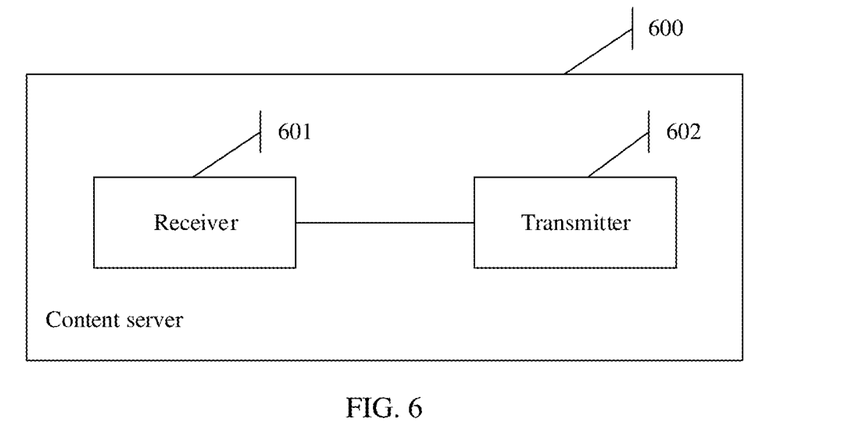
FIG. 6 is a schematic structural diagram of a content server according to an embodiment of this application.

Based on a same concept, FIG. 6 shows a content server 600 according to an embodiment of this application. As shown in FIG. 6, the content server 600 includes a receiver 601 and a transmitter 602. The receiver 601 may be configured to perform S401 and S402 in the embodiment shown in FIG. 4A and FIG. 4B, and/or configured to support another process of the art described in this specification. The transmitter 603 may be configured to perform S405 shown in FIG. 4A and FIG. 4B, and/or configured to support another process of the art described in this specification. All related content of the steps in the foregoing method embodiments may be cited as function descriptions of corresponding functional modules, and details are not described herein again.

Figure 7:
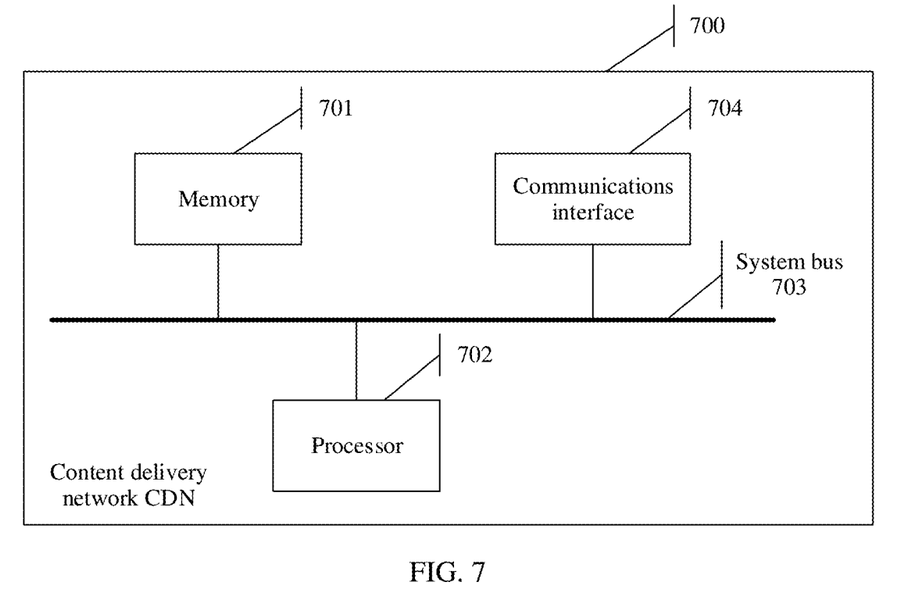
FIG. 7 is a schematic structural diagram of a content delivery network CDN according to an embodiment of this application.
Figure 8:
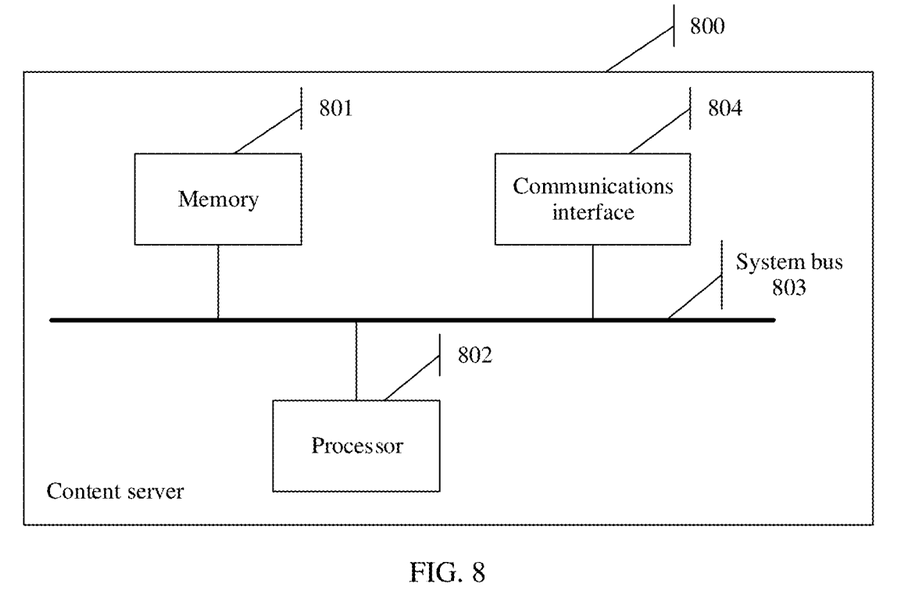
FIG. 8 is a schematic structural diagram of a content server according to an embodiment of this application.

Based on a same concept, FIG. 8 shows a content delivery network CDN 700 according to an embodiment of this application. As shown in FIG. 7, the content delivery network CDN 700 includes a memory 701, a processor 702, a system bus 703, and a communications interface 704. The memory 701, the processor 702, and the communications interface 704 are connected by using the system bus 703. The memory 701 is configured to store a computer executable instruction. When the content delivery network CDN 700 runs, the processor 702 executes the computer executable instruction stored in the memory 701, so that the content delivery network CDN 700 performs the method steps performed by the content delivery network CDN in the embodiment shown in FIG. 4A and FIG. 4B. For a specific method, refer to the foregoing descriptions and related descriptions in the accompanying drawings. Details are not described herein again. The communications interface 704 may be a transceiver, or may include an independent receiver and an independent transmitter.

Based on a same concept, FIG. 8 shows a content server 800 according to an embodiment of this application. As shown in FIG. 8, the content server 800 includes a memory 801, a processor 802, a system bus 803, and a communications interface 804. The memory 801, the processor 802, and the communications interface 804 are connected by using the system bus 803. The memory 801 is configured to store a computer executable instruction. When the content server 800 runs, the processor 802 executes the computer executable instruction stored in the memory 801, so that the content server 800 performs the method steps performed by the content server in the embodiment shown in FIG. 4A and FIG. 4B. For a specific method, refer to the foregoing descriptions and related descriptions in the accompanying drawings. Details are not described herein again. The communications interface 804 may be a transceiver, or may include an independent receiver and an independent transmitter.

An embodiment of the present disclosure further provides a computer storage medium. The storage medium may include a memory, and the memory may store a program. The program performs all the steps performed by the content delivery network CDN recorded in the foregoing method embodiment shown in FIG. 4A and FIG. 4B.

An embodiment of the present disclosure further provides a computer storage medium. The storage medium may include a memory, and the memory may store a program. The program performs all the steps performed by the content server recorded in the foregoing method embodiment shown in FIG. 4A and FIG. 4B.

An embodiment of the present disclosure further provides a computer program product including an instruction. When the computer program product runs on a content delivery network CDN, the content delivery network CDN is enabled to perform all the steps performed by the content delivery network CDN recorded in the foregoing method embodiment shown in FIG. 4A and FIG. 4B.

An embodiment of the present disclosure further provides a computer program product including an instruction. When the computer program product runs on a content server, the content server is enabled to perform all the steps performed by the content server recorded in the foregoing method embodiment shown in FIG. 4A and FIG. 4B.

A person skilled in the art should understand that the embodiments of the present disclosure may be provided as a method, a system, or a computer program product. Therefore, the embodiments of the present disclosure may use a form of hardware only embodiments, software only embodiments, or embodiments with a combination of software and hardware. Moreover, the embodiments of the present disclosure may use a form of a computer program product that is implemented on one or more non-transitory computer-usable storage media (including but not limited to a disk memory, a CD-ROM, an optical memory, and the like) that include computer-usable program code.

The embodiments of the present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to embodiments of the present disclosure without departing from the spirit and scope of this application. This application is intended to cover these modifications and variations provided that they fall within the scope of protection defined by the following claims and their equivalent technologies.

What is claimed is:

1. An authentication method, comprising:
    receiving, by a content delivery network (CDN), a content access request sent by a client, wherein the content access request is used to request access to a content resource, the content access request includes a first authentication credential, a second authentication credential, a content file path of the content resource, and a content number used to identify the content resource received by the client from a content server, the first authentication credential includes a first signature and is based on a first key allocated by the CDN, and the second authentication credential is based on a second key allocated by a cloud server;
    authenticating, by the CDN, the first authentication credential using the first key, wherein the authenticating, by the CDN, the first authentication credential by using the first key includes generating, by the CDN, a second signature based on an encryption algorithm and an input parameter, wherein the input parameter includes the first key, the content file path, the content number, and a valid time period, and the encryption algorithm is an algorithm the same as an encryption algorithm used when the content server authenticates the first authentication credential based on the first key allocated by the CDN;
    determining, by the CDN, the first authentication credential passes the authentication and that the content resource is not stored in the CDN, wherein the determining, by the CDN, that the first authentication credential passes the authentication includes determining that the first signature and the second signature are the same;
    sending, by the CDN, the content access request to the cloud server in response to determining the content resource is not stored in the CDN;
    receiving, by the CDN, the content resource from the cloud server, wherein the content resource is received from the cloud server by the CDN after authentication of the second authentication credential in the content access request by using the second key and determination that the second authentication credential passes the authentication; and
    sending, by the CDN, the content resource to the client.

2. The method according to claim 1, further comprising:
    authenticating the second authentication credential using the second key in response to receiving the content access request from the CDN;
    determining that the second authentication credential passes the authentication; and
    receiving the content resource by the CDN in response to the second authentication credential passing the authentication.

3. The method according to claim 1, wherein the content access request further defines the valid time period, and before the CDN performs authentication on the first authentication credential using the first key, the method further comprises:
    determining, by the CDN, that a time at which the content access request is received is within the valid time period.

4. An authentication method, comprising:
    receiving, by a content server, a first content access request sent by a client, wherein the first content access request requests access to a content resource;
    generating, by the content server, a first authentication credential based on a first key allocated by a content delivery network (CDN), wherein the generating the first authentication credential includes generating a first signature based on the first key, a content file path of the content resource, a content number that identifies the content resource, a first valid time period, and a first encryption algorithm, wherein the first encryption algorithm is an algorithm allocated by the CDN, and the first valid time period indicates a time period within which the first authentication credential is valid;
    generating, by the content server, a second authentication credential based on a second key allocated by a cloud server, wherein the generating the second authentication credential based on the second key includes generating a second signature based on the second key, the content file path and the content number that are of the content resource, a second valid time period, and a second encryption algorithm, wherein the second encryption algorithm is an algorithm allocated by the cloud server, and the second valid time period is used to indicate a time period within which the second authentication credential is valid; and
    sending, by the content server, a second content access request to the client in response to receiving the first content access request, wherein the second content access request includes the first authentication credential for accessing the content resource in response to being stored on the CDN and the second authentication credential for accessing the content resource in response to being stored on the cloud server.

5. The method according to claim 4, wherein the first encryption algorithm is one of a symmetric encryption algorithm, an asymmetric encryption algorithm, a hash algorithm, or an HMAC algorithm, and the second encryption algorithm is one of a symmetric encryption algorithm, an asymmetric encryption algorithm, a hash algorithm, or an HMAC algorithm.

6. A content delivery network (CDN), comprising:
a receiver, configured to receive a content access request sent by a client, wherein the content access request requests access to a content resource, the content access request includes a first authentication credential, a second authentication credential, a content file path of the content resource and a content number used to identify the content resource, the first authentication credential includes a first signature and is generated by a content server based on a first key allocated by the CDN, and the second authentication credential is generated by the content server based on a second key allocated by a cloud server;
a non-transitory computer readable medium configured to store computer executable instructions; and
a processor operably associated with the non-transitory computer readable medium and, when the processor executes the computer executable instructions, the processor is configured to:
perform authentication on the first authentication credential by using the first key to generate a second signature based on an encryption algorithm and an input parameter, wherein the input parameter includes the first key, the file content path, the content number, and a valid time period, and the encryption algorithm is an algorithm the same as an encryption algorithm used to authenticate the first authentication credential based on the first key allocated by the CDN; and
determine that the first authentication credential passes the authentication of the first authentication credential and that the content resource is not stored in the CDN by determining that the first signature and the second signature are the same; and
a transmitter, configured to send the content access request to the cloud server in response to determining the content resource is not stored in the CDN;
wherein, the receiver is further configured to receive the content resource sent by the cloud server, wherein the content resource is the content resource sent by the cloud server to the CDN after the cloud server performs authentication on the second authentication credential in the content access request by using the second key and determines that the second authentication credential passes the authentication; and
the transmitter is further configured to send the content resource to the client.

7. The content delivery network CDN according to claim 6, wherein:
the processor is further configured to determine that the first authentication credential passes the authentication and that the content resource is stored in the CDN; and
the transmitter is further configured to send the content resource to the client.

8. The content delivery network CDN according to claim 7, wherein the content access request further defines a valid time period, and the processor is further configured to determine, before authenticating the first authentication credential using the first key, that a time at which the content access request is received is within the valid time period.

9. A content server, comprising:
a receiver, configured to receive a first content access request sent by a client, wherein the first content access request requests access to a content resource;
a transmitter, configured to send a second content access request to the client, wherein the second content access request carries a first authentication credential, a second authentication credential, a content file path of the content resource and a content number used to identify the content resource;
a processor; and
a non-transitory computer readable medium that stores computer executable instructions, wherein when the processor executes the computer executable instructions, the processor is configured to:
generate the first authentication credential based on a first key allocated by a CDN, wherein the processor is configured to generate the first authentication credential based on the first key by generating a first signature based on the first key, a content file path of the content resource and a content number that identifies the content resource, a first valid time period, and a first encryption algorithm, wherein the first encryption algorithm is an algorithm allocated by the CDN, and the first valid time period is used to indicate a time period within which the first authentication credential is valid; and
generate the second authentication credential based on a second key allocated by a cloud server, wherein the processor is configured to generate the second authentication credential based on the second key by generating a second signature based on the second key, the content file path and the content number, a second valid time period, and a second encryption algorithm, wherein the second encryption algorithm is an algorithm allocated by the cloud server, and the second valid time period is used to indicate a time period within which the second authentication credential is valid.

10. The content server according to claim 9, wherein the first encryption algorithm is one of a symmetric encryption algorithm, an asymmetric encryption algorithm, a hash algorithm, or an HMAC algorithm, and the second encryption algorithm is one of a symmetric encryption algorithm, an asymmetric encryption algorithm, a hash algorithm, or an HMAC algorithm.

11. A content delivery network (CDN), wherein the CDN comprises a processor and a memory, wherein
the memory is configured to store one or more computer programs; and
when the one or more computer programs stored in the memory are executed by the processor, the CDN is enabled to perform the method according to claim 1.

12. A content server, wherein the content server comprises a processor and a memory, wherein the memory is configured to store one or more computer programs and when the one or more computer programs stored in the memory are executed by the processor, the content server is enabled to perform the method according to claim 4.

13. A non-transitory computer storage medium that stores a computer program that configures a processor to perform the method according to claim 1.

14. A non-transitory computer storage medium that stores a computer program that configure a processor to perform the method according to claim 4.

* * * * *